(No Model.)
G. HEFFNER.
NUT LOCK.
No. 377,613. Patented Feb. 7, 1888.
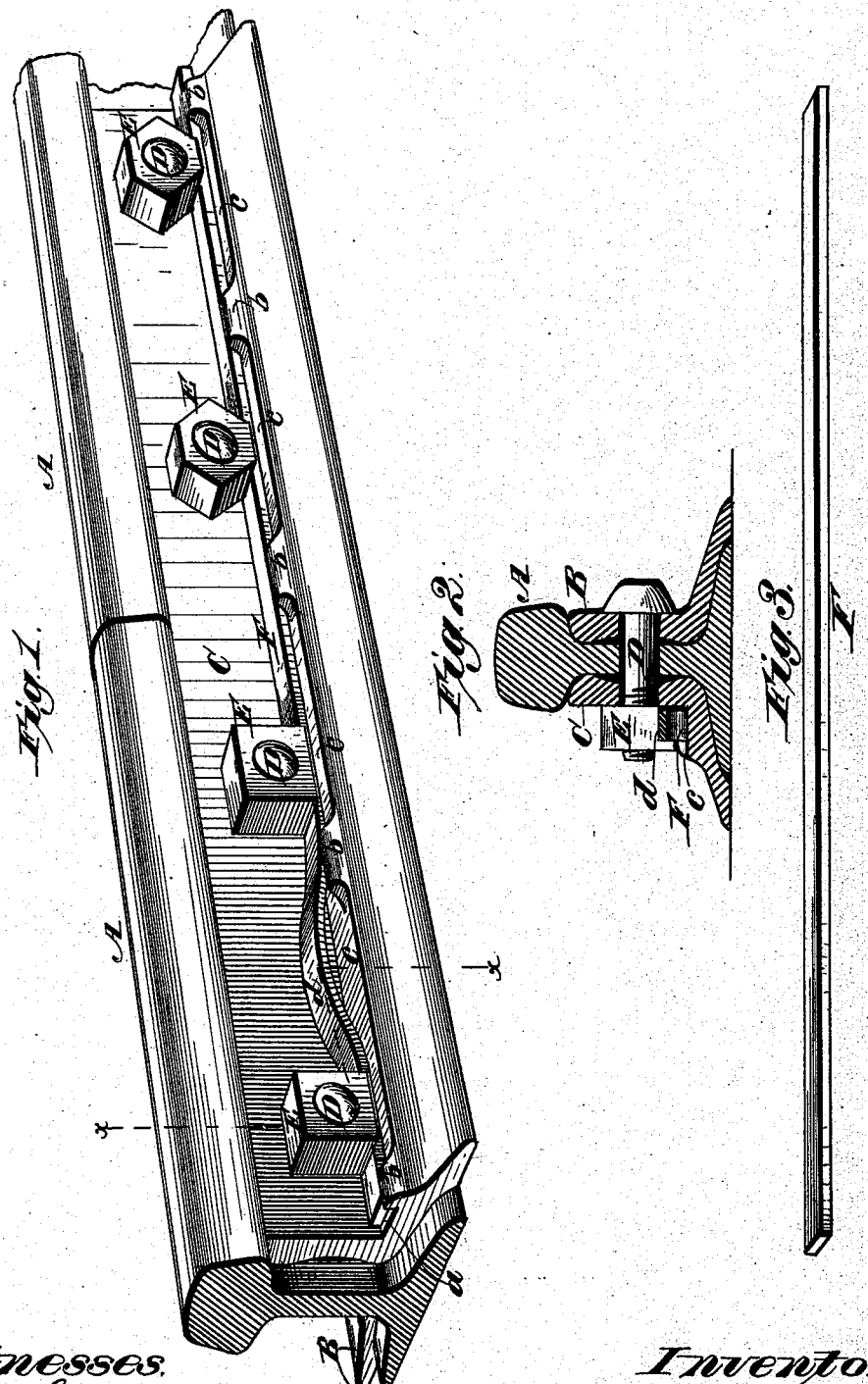
Witnesses
Rht Ewett,
George W. Rea.
Inventor
George Heffner
By James L. Norris
Atty.

UNITED STATES PATENT OFFICE.

GEORGE HEFFNER, OF LOUISVILLE, KENTUCKY.

NUT-LOCK.

SPECIFICATION forming part of Letters Patent No. 377,613, dated February 7, 1888.

Application filed September 8, 1887. Serial No. 249,120. (No model.)

*To all whom it may concern:*

Be it known that I, GEORGE HEFFNER, a citizen of the United States, residing at Louisville, in the county of Jefferson and State of Kentucky, have invented new and useful Improvements in Nut-Locks, of which the following is a specification.

This invention relates to improvements in the nut-lock for which Letters Patent No. 361,515 were granted to me April 19, 1887; and it consists in the combination, with the rails, bolts, nuts, and a flat locking-bar located beneath and in contact with the lower edges of the nuts, of a fish-plate having a longitudinal ledge or channel to receive and support the entire length of the locking-bar, the outer edge of said channel being formed by a longitudinal rib or flange broken at short intervals by elongated notches or recesses, each of which extends in front of a nut and to a considerable distance across the space between the adjacent nuts, so as to afford room for using a wrench to tighten or loosen the nuts and admit the insertion of a prying-instrument beneath the flat locking-bar at some point between two nuts, whereby the nuts can be conveniently tightened, and the locking-bar then be bent or curved upward between two nuts to prevent said bar from slipping endwise.

The invention is illustrated in the accompanying drawings, in which—

Figure 1 is a perspective view of two abutting railroad-rails with my improved nut-locking devices applied. Fig. 2 is a cross-section on the line *x x*. Fig. 3 is a view of the nut-locking bar.

The letter A designates the abutting portions of two railroad-rails, B C the fish-plates, D the bolts, and E the nuts.

On the side of the rails where the nuts are located is placed the fish-plate C, which is provided with a horizontal channeled ledge, *a*, extending the entire length of the fish-plate beneath the lower edges of the nuts. This channeled ledge *a* has a rib or flange, *b*, along its outer edge, and at suitable intervals the rib or flange is broken by elongated notches or recesses *c*, as shown in Fig. 1. The channeled ledge *a* behind the recessed rib *b* is of sufficient width to receive a close-fitting flat bar, F, which is not quite so wide as the thickness of the nuts. This flat bar F is driven endwise into place beneath the nuts after they have been screwed tightly onto the bolts with their lower ends parallel with the horizontal surface of the channeled ledge. By fitting closely behind the rib *b* and beneath the nuts E the locking-bar F holds the nuts securely and prevents them from turning or working loose on the bolts.

In order to prevent the locking-bar F from slipping out of place beneath any nut, I bend a portion of the bar upward in a curved form between two adjacent nuts, as at *d*, Fig. 1. This is done by means of any suitable prying implement after the locking-bar has been driven endwise into the channeled ledge *a* beneath all the nuts. After the bar F has been put in place it can be bent or curved upward in this manner at one or more points, as required.

It will be seen that the elongated recesses *c* are located in the rib *b* at such points as to afford easy access in the spaces between the nuts for the insertion of a prying implement beneath the flat locking-bar F, thus enabling it to be readily bent or curved upward at any desired point along the fish-plate. The curve or bend *d* thus imparted to the bar F causes it to bind or wedge tightly against two adjacent nuts in such a manner as to obviate any liability of slipping in either direction. If it is desired to remove or tighten the nuts, the bend *d* is hammered down until the bar F is restored to its former flat condition, when it can be driven endwise from beneath the nuts.

Besides affording access for a prying-instrument, the elongated recesses *c* are also arranged or located in such a manner as to extend in front of each nut and so give convenient access for a wrench or spanner when it is desired to tighten or remove the nuts. Each elongated recess *c* is therefore of such length as to occupy the entire space in front of a nut and to extend beyond the same to a point between two adjacent nuts where a prying implement can be conveniently applied beneath a portion of the locking-bar about midway between said nuts. By this construction the channeled ledge *a*, with its rib or flange *b*, prevents lateral displacement of the locking-bar F, while the bend or curve *d*, formed in said bar after it has been inserted beneath the nuts, will serve as an effective means of preventing its endwise movement in either direction. At the same time this bend or curve can be easily straightened to permit the withdrawal of the locking-bar whenever required.

What I claim as my invention is—

In a nut-lock, the combination, with the rails, bolts, nuts, and a flat locking-bar driven endwise beneath said nuts, of a fish-plate having a channeled ledge to receive and support the entire length of the locking-bar, said ledge being provided on its outer edge with a longitudinal rib or flange having a series of elongated recesses, each extending in front of a nut to afford space for using a wrench in turning the nut, and extended also between two adjacent nuts to permit the insertion of an instrument beneath the locking-bar, whereby it is bent or curved upward between two nuts to prevent endwise slipping, substantially as described.

In testimony whereof I affix my signature in presence of two witnesses.

GEORGE HEFFNER.

Witnesses:
JAMES L. NORRIS,
JOS. L. COOMBS.